July 1, 1958     T. HOOKER ET AL     2,841,243
PURIFICATION OF HYDROGEN CHLORIDE
Filed June 26, 1957     2 Sheets-Sheet 1
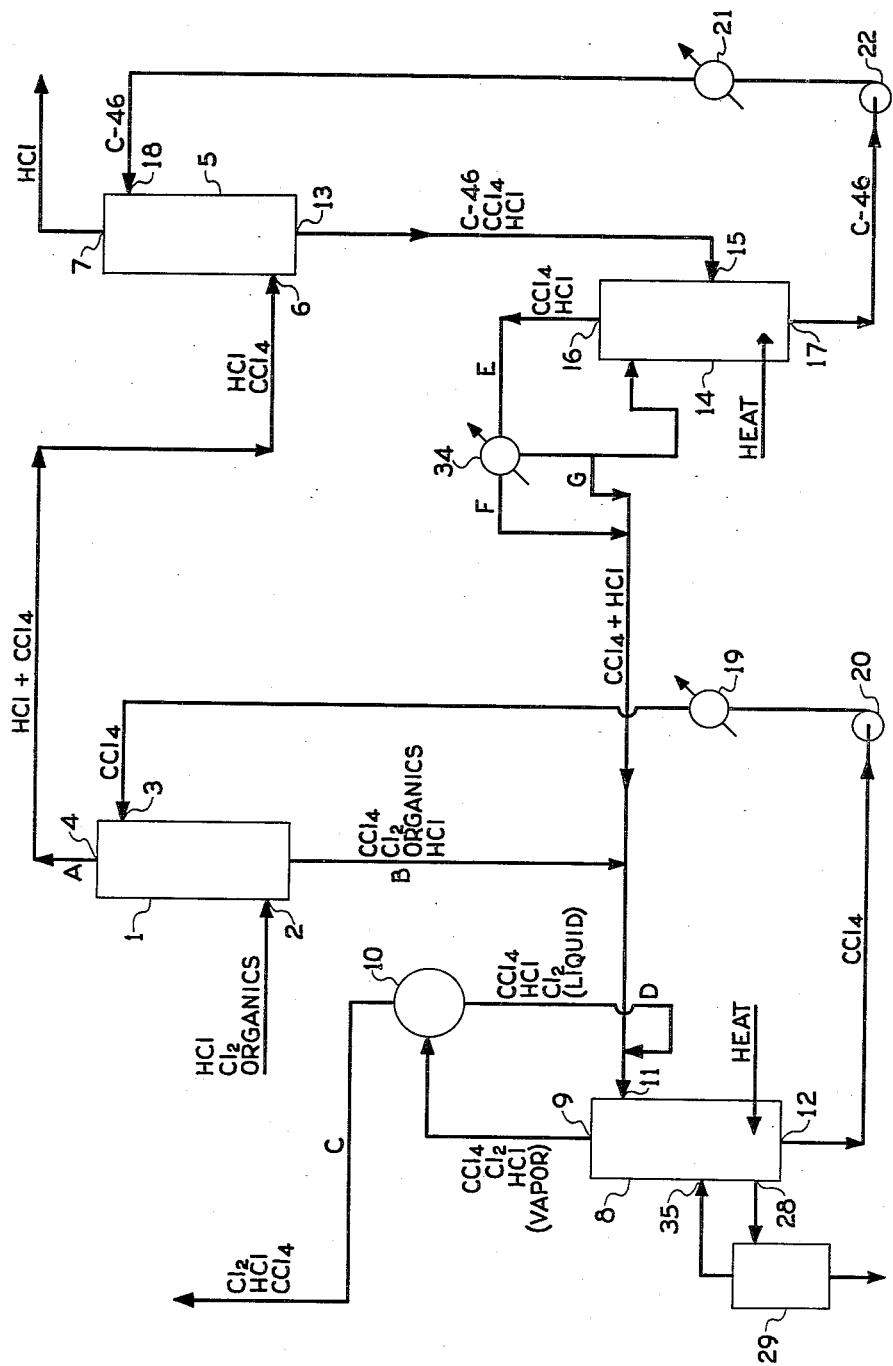
FIGURE I

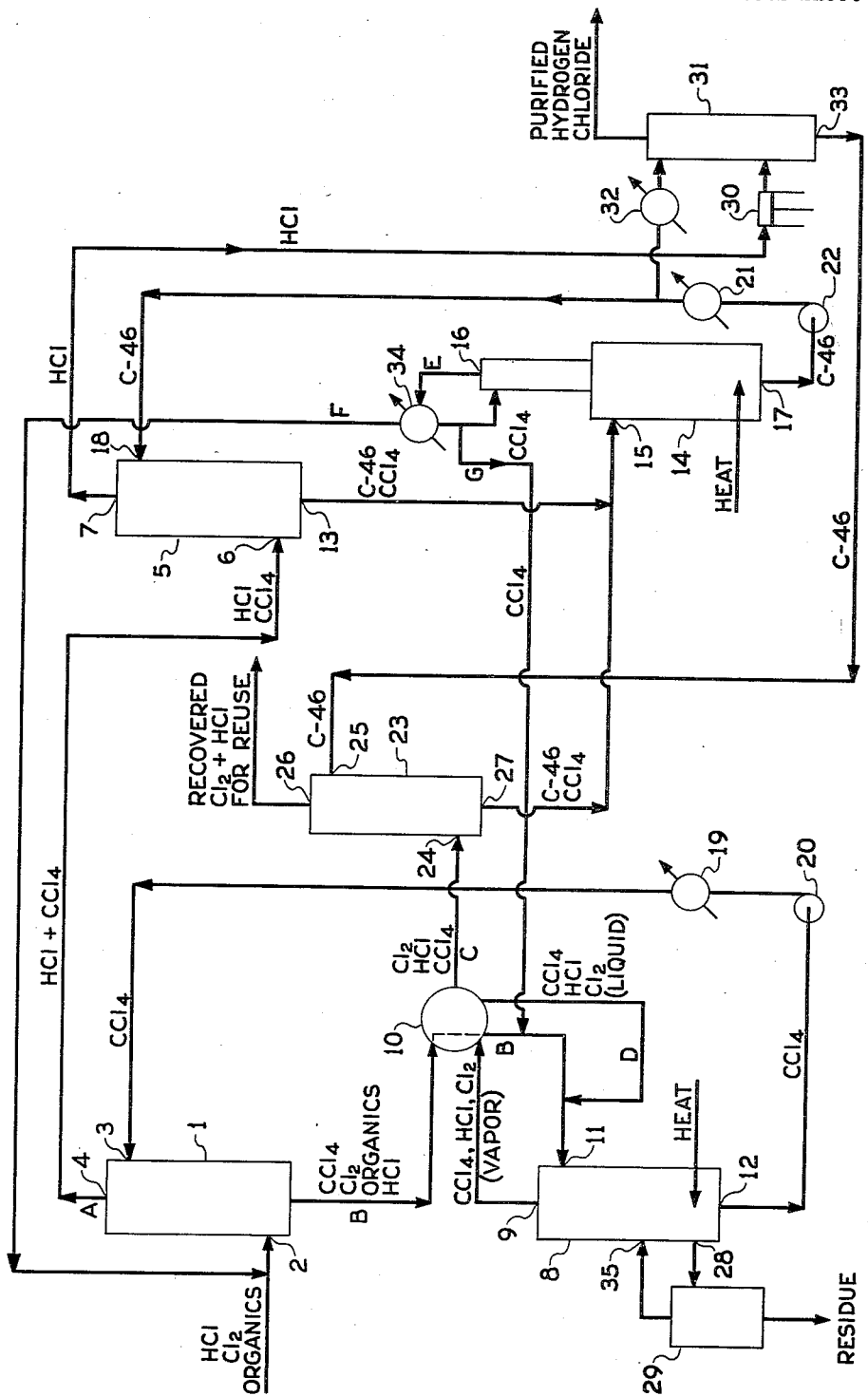
FIGURE II

United States Patent Office

2,841,243
Patented July 1, 1958

2,841,243

PURIFICATION OF HYDROGEN CHLORIDE

Thomas Hooker, Youngstown, Emil J. Geering, Grand Island, and Aylmer H. Maude, Niagara Falls, N. Y., assignors to Hooker Electrochemical Company, Niagara Falls, N. Y., a corporation of New York Application June 26, 1957, Serial No. 668,162

17 Claims. (Cl. 183—115)

This invention relates to a process for purifying hydrogen chloride from undesirable contaminants. More particularly this invention relates to a process for treating a gaseous product, typically coming from an organic chlorination reaction and containing hydrogen chloride, chlorine and vapors of organic compounds wherein the recovery and separation of the hydrogen chloride from the other materials is carried out. This invention is particularly concerned with said foregoing process wherein said recovery and separation process is carried out continuously and in an economical manner.

It is known in the art that such gaseous mixtures containing hydrogen chloride may be purified by the muriatic acid absorption-desorption process. This process involves absorbing the gaseous mixture in water and subsequently partially desorbing it from the water solution by heating. This method produces acceptable hydrogen chloride, but the initial costs and the costs of maintaining the equipment are very high and all of the chlorine originally present in the gaseous mixture is difficult to recover. If vented to the atmosphere the lost chlorine represents a waste of valuable chlorine, and also involves air pollution or gas disposal problems.

It is, therefore, one of the objects of this invention to develop a more satisfactory purification method of gaseous products containing hydrogen chloride and typically also chlorine and vapors of organic compounds.

The principal object of this invention is to provide a new continuous process for the purification of such gaseous products wherein increased overall efficiency and economy are realized from improved operating conditions to provide a salable product and wherein substantially complete hydrogen chloride and chlorine recovery is obtained while minimizing the waste gas disposal problem. Another object of this invention is to provide a purified hydrogen chloride product having a chlorine content of less than 10 parts per million parts of product. Another object of this invention is to provide an anhydrous self-dehydrating and therefore non-corrosive process, thereby obtaining the major advantage of permitting iron construction and thus reducing construction and maintenance costs.

Other objects of this invention are to provide a process wherein the mechanical difficulties encountered in the prior art are avoided; to provide a process wherein the chlorine of the treated gaseous product is recovered for further use as dry chlorine under suitable pressure; to provide such a purification system which may be operated under either pressure or vacuum conditions.

A further object is to practice such a purification process utilizing a solvent system hereinafter described which permits the accomplishment and advantages of all of the foregoing objectives as well as permitting its practice under reduced costs for utilities such as heating, cooling, refrigeration and electricity. As will be evident to one skilled in the art, additional economies are possible within the scope of this invention such as by heat recuperation between various streams.

We have now found that these and related objects may be accomplished in a continuous process for the purification of such gaseous products by means of two-stage scrubbing with organic liquids wherein the chlorine and vapors of organic compounds are removed.

More particularly hydrogen chloride is separated from a gas mixture containing hydrogen chloride, chlorine and organic vapors by scrubbing said gas mixture in a first zone with a solvent such as carbon tetrachloride to remove chlorine and all organic vapors except vapors of the first zone solvent itself; thereafter scrubbing said resultant gas mixture in a second zone with a solvent having a higher boiling point than said first zone's solvent, to remove and recover first zone solvent. The hydrogen chloride of the gas mixture has thus been purified or separated from the other materials originally in the gas mixture. The recovered first zone solvent may then be recycled to said first scrubbing zone and the separated chlorine may also be recycled to the source chlorination process.

Said second zone solvent should be one that dissolves the solvent of the first zone. This second zone solvent should also have a higher boiling point or a lower vapor pressure than the solvent of the first zone, thereby being readily and substantially separable from said first zone solvent by distillation. The solvent of said second zone should also have a low vapor pressure for the reason that the effluent hydrogen chloride is saturated with this solvent and it therefore constitutes the major impurity of the effluent hydrogen chloride. This low vapor pressure accordingly limits the amount that will go off with the effluent hydrogen chloride, thereby giving a purer hydrogen chloride product.

Among the materials which are useful for second zone solvents in this process and the boiling points of each are: hexachlorobutadiene (hereinafter designated as C-46, a registered trademark of Hooker Electrochemical Company), boiling point 215 degrees centigrade; and trichlorobenzene, boiling point in the range of 210 degrees centigrade.

As compared to these second zone materials and their boiling points are the solvents which may be used in the first zone such as carbon tertachloride having a boiling point of 76.8 degrees centigrade, and perchloroethylene, having a boiling point of 121 degrees centigrade.

In order to accomplish the above objects we have found it essential to use the two solvent system for the following reasons:

The circulation rate for the first zone solvent or for a single solvent system is about ten times the circulation rate for the second zone solvent. If a single solvent were used, it would have to be the second zone solvent to minimize solvent losses and exit gas contamination and it would also have to be circulated at the previously mentioned higher rate. Preheating and cooling requirements for such large quantities of high boiling solvent would be very substantial, requiring large heat exchangers and high utility consumption. Sufficient savings in utilities alone can be made by using the two stage system to offset the cost of the additional equipment required in the two stage system.

The two solvent system provides an additional factor of safety against chlorine breakthrough into the product gas in event of minor malfunctions of the first stage system, since the second solvent also has chlorine dissolving capacity.

A further benefit that may be obtained in using the two solvent system is the reduction in first zone solvent loss gained thru the use of a chlorine enricher using the second stage solvent. Total loss of the first stage solvent can be lower when the recovered chlorine stream is scrubbed with the second stage solvent than when even low temperature level refrigeration is employed to separate the first stage solvent from the recovered chlorine stream.

Still another advantage of the dual solvent system is that sufficient first stage solvent materials are often present as chlorination by-products in the inlet gas stream to provide the small makeup requirements of first stage solvent. In such cases no external make-up of first stage solvent is required and side-streams of such materials may often be withdrawn for recovery.

The manner in which the process of the present invention is carried out will be more clearly understood from the following description of the accompanying drawings in which Figure I is a diagrammatic flow sheet of one simplified embodiment embraced within the scope of our invention and in which Figure II is a diagrammatic flow sheet of a detailed and preferred embodiment embraced within the scope of our invention.

Referring to Figure I: A gaseous mixture such as obtained as by-product gas from organic chlorinations, and consisting chiefly of hydrogen chloride, chlorine and vapors of organic compounds, is introduced at 2 into a packed tower chlorine absorber 1 where it is scrubbed with a low boiling solvent, in this case carbon tetrachloride introduced at 3. The packed tower 1 is 30 feet high and has an internal diameter of 8 inches and is packed with 1 inch saddles, which provide a great amount of surface area for the scrubbing process. The desired hydrogen chloride gas and some carbon tetrachloride vapor designated as A leave tower 1 at the top 4 and are cycled to packed $CCl_4$ absorber tower 5 which they enter at 6. Tower 5 is the second scrubbing zone and has dimensions and packing similar to tower 1.

The first zone solvent carbon tetrachloride, and the chlorine and organic vapors and also some hydrogen chloride designated as B leave the tower 1 at the bottom and enter the chlorine stripper 8 at 11. The overhead product leaving the chlorine stripper 8 at 9 is separated at condenser 10 into two major components. One component designated as C, a gas consisting of carbon tetrachloride, hydrogen chloride and chlorine is taken off separately and may be utilized in the original chlorination reaction or used otherwise. The other component designated as D, a liquid consisting of major amounts of carbon tetrachloride, minor amounts of chlorine and minor amounts of hydrogen chloride, is returned to the chlorine stripper 8 at 11. The solvent carbon tetrachloride from the chlorine stripper 8, substantially free of chlorine and hydrogen chloride, leaves the chlorine stripper at 12 is cooled and returned to the top of the chlorine absorber 1 at 3 by means of cooler 19 and pump 20.

Higher boiling organic and inorganic materials entering with the feed gas at 2 and absorbed in the first scrubbing zone are separated from the first zone solvent by withdrawing a liquid side stream at 28 from $Cl_2$ stripper reboiler 8 to a purifying still 29 which is maintained at a higher temperature than said $Cl_2$ stripper reboiler. This liquid side stream is separated into two streams, an overhead vapor rich in first zone solvent which is returned to $Cl_2$ stripper 8 at 35 and a liquid fraction rich in high boiling organic impurities which may be withdrawn continuously or intermittently. The system is such therefore, that the first zone solvent from the chlorine stripper has in a measure been purified of these high boiling organics and inorganic materials when it is returned to the top of the chlorine absorber 1 at 3.

The gas mixture containing principally hydrogen chloride and carbon tetrachloride vapor leaving the tower 1 at 4 enters the $CCl_4$ absorber 5 at 6. Packed tower 5 is irrigated with the high boiling solvent, in this case hexachlorobutadiene (C–46). The desired product hydrogen chloride, is removed from this absorber at 7 as overhead product. The stream leaving the $CCl_4$ absorber 5 at 13, and consisting of major amount of C–46 and smaller amounts of $CCl_4$ and minor quantities of hydrogen chloride, is introduced at 15 into the $CCl_4$ stripper 14. The overhead product designated as E of the $CCl_4$ stripper 14 consisting of carbon tetrachloride and hydrogen chloride leaves said stripper at 16 and enters condenser 34 where sufficient carbon tetrachloride is condensed to provide reflux for the $CCl_4$ enriching section of $CCl_4$ stripper 14 to minimize loss of C–46. The HCl vent gas containing the recovered $CCl_4$ designated as F and excess $CCl_4$ condensate, if any, designated as G, from condenser 34 is also returned to the first stage system. The stripped C–46 leaving the $CCl_4$ stripper 14 at 17 is cooled and returned to the top of the $CCl_4$ absorber 5 at 18 by means of cooler 21 and pump 22.

The amount of solvent vapor in the product HCl may, as will be described more fully when discussing Figure II, be further reduced by means of a third absorber or scrubbing column preferably operating under pressure and irrigated with low vapor pressure solvent which may be refrigerated. Alternatively, the C–46 fed to $CCl_4$ absorber 5 may be lowered in temperature by refrigeration to reduce the amount of solvent vapor in the product HCl and thereby eliminate the necessity of a third absorbing tower.

The following Example 1 utilizing the equipment of Figure I shows the preparation of a relatively pure hydrogen chloride product from the foregoing described starting materials and which is in condition for many commercial applications where minor organic contamination is not critical. Example 2 which utilizes the equipment of Figure II is similar to Example 1 except that higher purity hydrogen chloride product is obtained by more complete separation of second zone solvent material from same. Other process refinements are also discussed in Example 2.

Example 1

A gaseous mixture such as obtained as by-product gas from organic chlorinations, consisting of 5530 parts by weight HCl, 371 parts of $Cl_2$, 86 parts of $C_2Cl_4$, 37 parts of $C_2Cl_6$ and 160 parts of $CCl_4$, was introduced at 2 into the $Cl_2$ absorber 1, where it was scrubbed with carbon tetrachloride at about 35 degrees centigrade introduced at 3. The amount of the carbon tetrachloride employed in the scrubbing process is in the region of 270,000 parts or sufficient to absorb all the chlorine. Under normal operating conditions and after equilibrium is attained, the following describes the concentrations of the various streams obtained in the process of this invention.

The mixture above was separated into two major portions, the desired overhead fraction A: consisting of 5030 parts of HCl, 5850 parts of $CCl_4$ and 0.312 part of $Cl_2$; and fraction B: consisting of 264,000 parts of $CCl_4$, slightly less than 371 parts of $Cl_2$, 500 parts of HCl, 86 parts of $C_2Cl_4$ and 37 parts of $C_2Cl_6$. Fraction B was then cycled to the chlorine stripper 8 along with 5850 parts of $CCl_4$ from $CCl_4$ stripper 14. The liquid in the reboiler of $Cl_2$ stripper 8 was boiled. The overhead product leaving $Cl_2$ stripper 8 at 9 is separated into two components C and D at condenser 10, which is cooled in order to reduce the amount of $CCl_4$ going off in component C. Component C is a gas and represents the recovered $Cl_2$. It consists of 530 parts of HCl, 371 parts of $Cl_2$ and 38 parts of $CCl_4$ and may be recycled to the original chlorination reaction. Component D is a liquid consisting of 3497 parts of $CCl_4$, 269 parts of $Cl_2$ and 56 parts of HCl which is returned to chlorine stripper 8 at 11. The chlorine free $CCl_4$ leaving the $Cl_2$ stripper 8 at 12 is cooled and returned to the first scrubbing zone or $Cl_2$ absorber 1 at 3 by means of pump 20 and cooler 19.

The previously described overhead fraction A leaving the $Cl_2$ absorber 1 at 4, enters the $CCl_4$ absorber 5 at 6, at a temperature about 35 degrees centigrade and is then scrubbed with hexachlorobutadiene. The amount of C–46 employed in the scrubbing process is in the region of 38,030 parts or sufficient to absorb all the CCl₄ from stream A. The overhead product leaving CCl₄ absorber 5 at 7, consists of 5000 parts of HCl, 5 parts CCl₄, 31 parts of C–46 and the slightest traces of Cl₂. The solvents consisting of 38,030 parts of C–46 and 5850 parts of CCl₄ along with 30 parts of HCl leave tower 5 at 13 and enter heated CCl₄ stripper 14 at 15 where the C–46 is separated from CCl₄ and HCl. The C–46 leaves stripper 14 at 17 and is cooled and returned to CCl₄ absorber 5 and CCl₄ leaving stripper 14 at 16 are returned to the chlorine stripper 8. Condenser 34 permits some CCl₄ to be used for refluxing purposes of the CCl₄ enricher portion of stripper 14. Streams F and G, if any, also leaving condenser 34 are comprised of 5850 parts of CCl₄, 2.9 parts of C–46 and 30 parts of HCl. The liquid in the reboiler of CCl₄ stripper 14 was maintained at its boiling point. The CCl₄ free C–46 leaving the CCl₄ stripper is cooled and returned to the CCl₄ absorber 5 at 18 by means of pump 22 and cooler 21.

A good idea of the effectiveness of the subject purification process may be obtained from comparing the materials and quantities thereof in the initial starting material with the materials and quantities thereof in the final HCl product.

*Example 2*

A gaseous mixture such as obtained as by-product gas from organic chlorinations, consisting of 6952 parts by weight of HCl, 706 parts of Cl₂, 133 parts of C₂Cl₄, 85 parts of CCl₄, 24 parts of C₂Cl₆ and 7.3 parts of C₂HCl₃, was introduced at 2 into the packed tower 1, where it was scrubbed with carbon tetrachloride introduced at 3. The amount of the carbon tetrachloride employed in the scrubbing process is in the region of 400,000 parts. Under normal operating conditions and after equilibrium attained, the following describes the concentration of the various streams obtained in the process of this invention.

The mixture above was separated into two major portions, the desired overhead fraction A consisting of 6182 parts of HCl, 6350 parts of CCl₄ and 2.47 parts of Cl₂; and fraction B: consisting of 393,650 parts of CCl₄, 703.5 parts of Cl₂, 770 parts of HCl, 133 parts of C₂Cl₄, 24 parts of C₂Cl₆ and 7.3 parts of C₂HCl₃. The treatment of fraction B will be described hereafter.

The overhead fraction A leaving the Cl₂ absorber 1 at 4, enters the CCl₄ absorber 5 at 6, at a temperature about 35 degrees centigrade, and is then scrubbed with hexachlorobutadiene. The amount of C–46 employed in the scrubbing process is in the region of 41,600 parts, or sufficient to absorb all the CCl₄ from stream A. The overhead product leaving CCl₄ absorber 5 at 7, consists of 6166 parts of HCl, 3 parts of CCl₄, 45 parts of C–46 and substantially no Cl₂.

This overhead product is then further purified of organics by compressing it in the HCl compressor 30 and thence cycling it through a third scrubbing column 31 which is irrigated with C–46 refrigerated to minus 15 degrees centrigrade at chiller 32. The jurified hydrogen chloride leaving scrubbing column 31 consists of 6130 parts of HCl, substantially no CCl₄ or Cl₂ and 0.6 part of C–46.

One or the other of either the vapor compression step at 30 or the solvent refrigeration step at 32 may be omitted if the requirement for elimination of organic impurity is not too stringent.

Having thus described the flow and purification of the main product stream, we shall now proceed to describe the treatment of fraction B leaving Cl₂ absorber 1 as well as the treatment of the fractions leaving CCl₄ absorber 5 at 13, C–46 absorber 31 at 33, and CCl₄ stripper 14 at 17, and the equipment and process steps used in treating these latter 3 fractions.

Fraction B, leaving the Cl₂ absorber 1 and having the composition previously described, may be passed through condenser 10 for preheating and then cycled to the Cl₂ stripper 8 at 11, along with 6350 parts of CCl₄ designated as stream G from CCl₄ stripper 14. The liquid in the reboiler of Cl₂ stripper 8 was boiled. The overhead product leaving Cl₂ stripper 8 at 9 is separated into two components C and D at the partial condenser 10 which is cooled in order to reduce the amount of CCl₄ going off in component C. Component C is a gas and represents the recovered Cl₂. It consists of 950 parts HCl, 706 parts of Cl₂ and 1525 parts of CCl₄ and is cycled to the Cl₂ enricher 23 entering said enricher at 24. At the Cl₂ enricher 23 the gas designated as C is scrubbed with C–46 which left the C–46 absorber 31 at 33 and which enters said enricher 23 to 25, thereby ridding said gas C of its CCl₄ component. The thus purified gas leaves Cl₂ enricher at 26 and may if desired be recycled to the original chlorination reaction. This purified gas consists of 950 parts of HCl, 706 parts of Cl₂ and 3.35 parts of C–46. The C–46 (6162 parts) used to separate the CCl₄ from gas stream C and the separated CCl₄ (1525 parts) leave the Cl₂ enricher 23 at 27 and enter the CCl₄ stripper 14 at 15 along with the C–46 and CCl₄ which leave the CCl₄ absorber 5 at 13.

Component D from condenser 10 is a liquid consisting of 5200 parts of CCl₄, 83 parts of HCl and 400 parts of Cl₂ and is joined to foregoing described streams B from the Cl₂ absorber 1 and G from CCl₄ stripper 14. Streams D, B and G all enter Cl₂ stripper 8 at 11. The chlorine free CCl₄ leaves the Cl₂ stripper 8 at 12, and is cooled and returned to Cl₂ absorber 1 at 3 by means of cooler 19 and pump 20.

Higher boiling organic and inorganic materials entering with the feed gas at 2 and absorbed in the first scrubbing zone are separated from the first zone solvent by withdrawing a liquid side stream at 28 from Cl₂ stripper reboiler 8 to a purifying still 29 which is maintained at a higher temperature than said Cl₂ stripper reboiler. This liquid side stream is separated into two streams, an overhead vapor rich in first zone solvent which is returned to Cl₂ stripper 8 at 35 and a liquid fraction rich in high boiling organic impurities which may be withdrawn continuously or intermittently.

Mixtures of C–46 and CCl₄ leaving Cl₂ enricher 23 at 27 (6162 parts C–46 and 1525 parts CCl₄) and CCl₄ absorber 5 at 13 (41,555 parts C–46 and 6347 parts CCl₄) are joined and enter CCl₄ stripper 14 at 15. Stripper 14 then separates the C–46 from the CCl₄. The C–46 is cooled and the main parts of it (41,600 parts) returned to CCl₄ absorber 5 at 18 by means of pump 22 and cooler 21 while a minor portion of said C–46 stream (6120 parts) is sent through chiller 32 to the C–46 absorber 31 for additional purification of the HCl product also entering the C–46 absorber 31 after having been compressed at 30. Depending on the purity of HCl product required, either the step of refrigerating the C–46 at chiller 32 or compressing the HCl at compressor 30 may be omitted.

The C–46 from absorber 31 is then, as previously discussed, recycled to the Cl₂ enricher 23, entering said enricher at 25.

The overhead gas designated as E from CCl₄ stripper 14 and consisting of 16,168 parts of CCl₄ 71 parts of Cl₂ and 20 parts of HCl leaves the eenriching portion of said stripper at 16 and is cycled to condenser 34. The vent vapor from condenser 34 designated as F is partially separated from the CCl₄ of E and is recycled to the feed gas entering the system at 2. The remaining CCl₄ is further separated into a portion for refluxing the enricher of CCl₄ stripper 14 and stream G which is returned to Cl₂ stripper 8.

From the foregoing described drawings and examples it can readily be seen that the principal foregoing described objectives such as obtaining substantially pure hydrogen chloride, minimizing losses of hydrogen chloride, chlorine or first zone solvent, and accomplishing the foregoing on a continuous basis, have all been accomplished.

Also as previously stated, and as is apparent from considering the examples, water not only is not a part of the process, thereby obtaining the advantage of permitting iron construction and thus reducing construction and maintenance costs but the process is virtually anhydrous. Regarding any undesired moisture which may get into the system, the following may be stated. Small amounts of moisture in the feed gas can pass thru all scrubbing columns uncondensed, dependent on the vapor pressure of moisture and the temperatures at the gas exit points of the scrubbing columns. Moisture adventitiously entering the system leaves with the recovered chlorine. The chlorine leaving the system may, if desired, be dried by condensation or by the use of appropriate dehydrating agents. The process may therefore be termed as anhydrous self-dehydrating and therefore non-corrosive on iron equipment.

The foregoing described examples are intended to be illustrative only and not as limiting the scope of the invention. Particular solvents and quantities thereof used may be altered without departing from the spirit of this invention as may also some of the equipment items.

Having thus described our invention, what we claim and desire to secure by Letters Patent is:

We claim:

1. A process for recovering hydrogen chloride from a gaseous mixture containing hydrogen chloride, chlorine and organic vapors which comprises: scrubbing in a first zone, said gaseous mixture with a low boiling, halogenated solvent to remove chlorine and organic vapors for recovery; thereafter scrubbing in a second zone the effluent gas mixture from the first zone, which mixture contains first zone solvent and hydrogen chloride, with a solvent having a higher boiling point than said first zone solvent, thereby separating the low boiling first zone solvent from the hydrogen chloride of said effluent gas mixture.

2. The process of claim 1 wherein the first zone solvent removed from the effluent gas mixture at the second scrubbing zone is recycled to said first scrubbing zone.

3. The process of claim 1 wherein the low boiling solvent is selected from the group consisting of carbon tetrachloride and perchlorethylene.

4. The process of claim 1 wherein the higher boiling solvent is selected from the group consisting of hexachlorobutadiene and trichlorobenzene.

5. The process of claim 1 wherein the low boiling solvent is carbon tetrachloride and the higher boiling solvent is hexachlorobutadiene.

6. The process of claim 1 wherein the effluent liquid mixture from said first scrubbing zone, containing first zone low boiling solvent, chlorine, hydrogen chloride and high boiling organics, is treated in a chlorine stripper, thereby recovering the first zone low boiling solvent and a chlorine rich gas.

7. The process of claim 6 wherein the recovered first zone low boiling solvent is recycled to said first zone.

8. The process of claim 7 wherein a portion of the liquid from the chlorine stripper column is distilled to remove high boiling organics and recover pure solvent.

9. The process of claim 8 wherein the chlorine rich gas from the chlorine stripper is contacted in a chlorine enriching column with the second stage high boiling solvent to remove vapors of the low boiling first stage solvent.

10. The process of claim 9 wherein the low boiling first zone solvent and the higher boiling second zone solvent, mixed in said chlorine enriching column, are separated and then recycled to the first and second scrubbing zones respectively.

11. The process of claim 9 wherein the chlorine and hydrogen chloride from which the first zone low boiling solvent has been separated in the chlorine enricher are cycled for reuse in the original chlorination process.

12. The process of claim 1 wherein the effluent gas mixture from said second scrubbing zone is scrubbed in a third scrubbing zone irrigated with refrigerated higher boiling solvent, and the effluent gas from said third scrubbing zone thereafter recovered.

13. The process of claim 12 wherein the effluent gas mixture is compressed prior to being scrubbed in said third zone.

14. The process of claim 1 wherein the effluent gas mixture from said second scrubbing zone is compressed prior to being scrubbed in a third scrubbing zone irrigated with the higher boiling solvent, and the effluent gas from said third scrubbing zone thereafter recovered.

15. The process of claim 13 wherein the higher boiling solvent from said third scrubbing zone is recycled to a chlorine enriching column.

16. The process of claim 1 wherein the low boiling first zone solvent removed from the hydrogen chloride at said second scrubbing zone and said second zone higher boiling solvent are cycled from said second scrubbing zone to a stripper where they are separated from each other, the low boiling solvent then being recycled to said first scrubbing zone and the higher boiling solvent being recycled to said second scrubbing zone.

17. The process of claim 16 wherein the low boiling solvent is first cycled through a chlorine stripper prior to its return to said first scrubbing zone and wherein part of the higher boiling solvent is first cycled to a third scrubbing zone and thence to a chlorine enricher prior to its return to said second scrubbing zone.

References Cited in the file of this patent

UNITED STATES PATENTS

| | | |
|---|---|---|
| 2,236,964 | Babcock | Apr. 1, 1941 |
| 2,282,712 | Engs et al. | May 12, 1942 |
| 2,393,229 | Bouchard | Jan. 22, 1946 |
| 2,730,194 | Wohlers et al. | June 10, 1956 |

BEST AVAILABLE COPY

UNITED STATES PATENT OFFICE
CERTIFICATE OF CORRECTION

Patent No. 2,841,243                                      July 1, 1958

Thomas Hooker et al.

It is hereby certified that error appears in the printed specification of the above numbered patent requiring correction and that the said Letters Patent should read as corrected below.

Column 2, line 42, for "carbon tertachloride" read -- carbon tetrachloride --; column 5, lines 9 and 10, for "absorver" read -- absorber --; line 10, for "$CCl_4$" read -- the $CCl_4$ and HCl --; line 12, for "of" read -- in --; line 36, for "concentration" read -- concentrations --; line 57, for "centrigrade" read -- centigrade --; same line, for "jurified" read -- purified --; column 6, line 12, for "to" read -- at --; line 60, for "$CCl_4$ 71 parts of $Cl_2$" read -- $CCl_4$, 71 parts of $Cl_2$, --; line 61, for "HCl" read -- HCl, --; same line, for "eenriching" read -- enriching --.

Signed and sealed this 24th day of March 1959.

(SEAL)
Attest:
KARL H. AXLINE

Attesting Officer

ROBERT C. WATSON
Commissioner of Patents